March 6, 1951
J. L. ANDREWS
2,544,289
FILTER AND PULSATION DAMPENER
Filed June 26, 1946
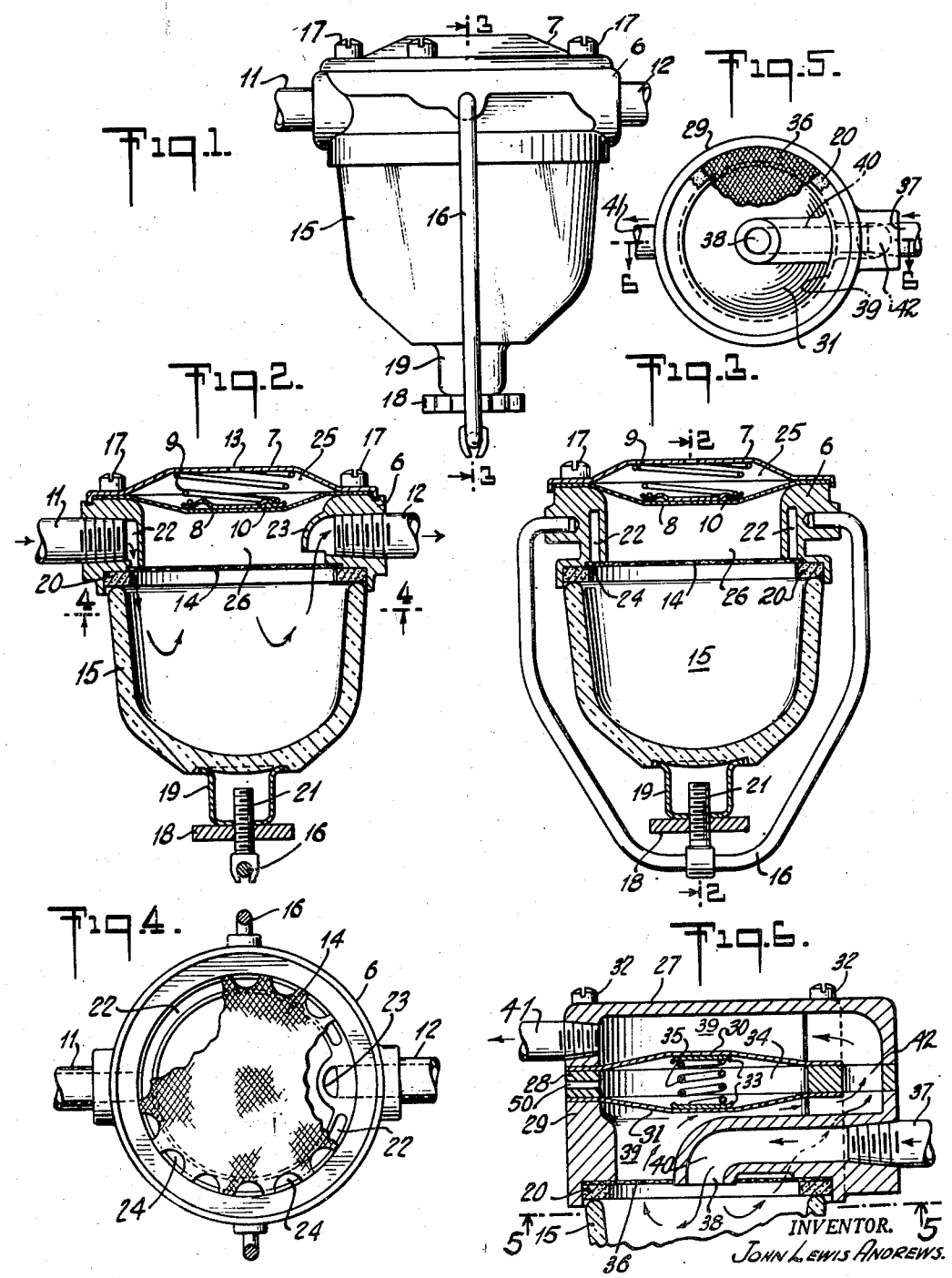
INVENTOR.
JOHN LEWIS ANDREWS.
BY
Emanuel Scheyer
ATTORNEY.

Patented Mar. 6, 1951

2,544,289

UNITED STATES PATENT OFFICE 2,544,289

FILTER AND PULSATION DAMPENER

John Lewis Andrews, Fairfield, Ill., assignor to Chefford Master Manufacturing Co. Inc., a corporation of Illinois Application June 26, 1946, Serial No. 679,508

2 Claims. (Cl. 210—165)

This invention relates to a filter and pulsation dampening device particularly applicable to the gasoline supply systems of internal combustion engines. The device is located between the fuel pump and the carburetor where that type of fuel feed is used. In this case, the fuel, generally gasoline, is forced from a remote tank to the carburetor by means of the fuel pump, usually having a pulsating diaphragm operated from the engine cam shaft. Fuel is admitted to the carburetor bowl and the fuel level maintained substantially constant therein by means of a float operated needle valve. This needle valve is exposed to pulsations in the feed line, which tend to cause the needle to fluctuate during operation, substantially shortening the life of the needle and its seat and unsteadying the fuel level. An unsteady fuel level increases the gas consumption. The filter forming the subject of the present invention is provided with a spring controlled air space or auxiliary chamber, which expands and contracts with the pulsations in the feed line between the pump and the filter, resulting in substantially steady flow of fuel from the filter outlet. In one form, the air space is defined by a rigid wall on one side and a flexible diaphragm or collapsible wall on the other, the walls being normally held in spaced relation by a spring. In another form, the air space is defined by oppositely disposed flexible diaphragms or collapsible walls normally held apart by a spring. In a broad sense, the auxiliary chamber is a resiliently contractile chamber having its volumetric capacity reduced in accordance with the increase in pressure in the main chamber of the filter. Another way of regarding the invention is that it provides a filter and pulsation dampening device in which the pulsating feed means feeds the liquid through filtering means located in a chamber, one wall of which is pushed out against resilient resistance as the pressure in the chamber is increased, said wall being allowed to return when the pressure in said chamber decreases. In its broadest sense, the volume of the filter chamber is increased against a resilient resistance when the pressure in said chamber is increased, and said volume is decreased with a decrease in the resistance when the pressure in said chamber is decreased.

A further advantage of my invention is that the expansion of the auxiliary chamber or the return of the diaphragm or diaphragms produces a self-cleaning action on the filter means or screen as shown in the particular embodiments illustrated. It has been found that a definite self-cleaning action takes place due to said expansion or return forcing liquid in the reverse direction through the filter means, thereby causing the caught particles to loosen and fall to the bottom of the filter chamber.

Other objects and advantages will become apparent upon further study of the description and drawings, in which:

Fig. 1 is an elevation of the filter dampener.

Fig. 2 is a section taken along the line 2—2 of Fig. 3.

Fig. 3 is a vertical section of the device taken at right angles to Fig. 2. It is taken along the line 3—3 of Fig. 1.

Fig. 4 is a sectional plan taken along the line 4—4 of Fig. 2, the glass filter bowl being omitted.

Fig. 5 is a sectional plan, to a smaller scale, looking along the line 5—5 of Fig. 6, the glass bowl being omitted as well as having a portion of the screen and gasket broken away. The device of Figs. 5 and 6 shows a modified form of the dampening mechanism, and Fig. 6 is a section taken along the line 6—6 of Fig. 5.

The cover of the filter, Figs. 1—4, consists of a casting 6 and a sheet metal plate 7. The edge of diaphragm 8 is pinched between plate 7 and casting 6 by means of screws 17. Spring 9, which bears at its bottom against washer 10 and at its top against the underside of plate 7, normally keeps diaphragm 8 in its lowest position. An air hole 13 may be provided in plate 7 for the escape of air from space or auxiliary chamber 25 when the latter is contracted. Between casting 6 and the top of bowl 15 is gasket 20, bowl 15 being pressed against said gasket by the well-known construction comprising bail 16, bolt 21, cup 19 and nut 18. As can readily be understood, plate 7 can be provided with many holes 13, in which case plate 7 acts merely as a guard and a reactance for spring 9, and diaphragm 8 is a movable wall of chamber 26.

Inlet connection 11 leads the fuel from a fuel pump, not shown, into channel 22 formed in casting 6. Below the open end of channel 22 is the scalloped edge of screen 14, the latter being held in place between gasket 20 and casting 6. The fuel from channel 22 passes down into bowl 15 mainly through notches or scallops 24 in the edge of screen 14. The fuel leaves bowl 15 by passing up through screen 14 into space 26, into cowl 23 and out outlet connection 12 to the carburetor, the latter not being shown. The fuel is filtered in passing up through screen 14.

Inlet connection 11 receives the fuel from a pulsating pump, not shown, so that there is a variation in pressure with each pulsation in the space in bowl 15 and in space 26, these spaces taken together constituting the main chamber of the filter. When the pressure increases, diaphragm 8 is pushed up against the resistance of spring 9, decreasing space or auxiliary chamber 25 but enlarging the main chamber constituting space 26 and the space in the bowl 15. The enlargement of the main chamber acts to equalize the pressure of the fuel in it and stores up compression in spring 9. After reaching the maximum pressure of the pulsation received from the pump, the pressure in space 26 and in bowl 15 would be sharply reduced. However, this is not the case, because at this time, diaphragm 8, which is in reality a collapsible wall of chamber 25, is moved down by the stored up compression in spring 9, increasing the volumetric capacity of chamber 25 but reducing the volume of and thereby equalizing the pressure in space 26 and bowl 15. Because of the equalization of pressure noted, the fuel leaves outlet connection 12 with but small variations in pressure and rate of flow, that is, the pulsations are substantially damped out.

When chamber 25 or chamber 34 expands, a certain quantity of liquid is forced momentarily down through portions of screen 14 or screen 36. This produces a cleaning action on the screens by causing particles adhering to the underside of the screens to be dislodged therefrom and to settle down into bowl 15.

It is to be observed that air is trapped by the fuel, because of the presence of cowl 23, in space 26 below diaphragm 8 and above the bottom of said cowl. This trapped air, which acts similarly to the well known air dome used in connection with pulsating pumps, assists the action of diaphragm 8 in dampening out the pulsations.

The cover of the device in the modified form, shown in Figs. 5 and 6, comprises three parts, a top part 27, a middle part 28 and a bottom part 29. Diaphragm 30 is held between parts 27 and 28 and diaphragm 31 is held between parts 28 and 29, all three parts and diaphragms being held together by screws 32. Located between washers 33 in space or auxiliary chamber 34 between diaphragms 30 and 31, is spring 35 which normally keeps said diaphragms their maximum distance apart. Chamber 34 can be said to have a pair of oppositely disposed collapsible walls. The provision of an air hole 50 in part 28, permits the escape of air from chamber 34 when its walls are collapsed. Screen 36 is held between gasket 20 and part 29, bowl 15 pressing against said gasket.

The fuel from the pump, not shown, enters inlet connection 37, passage 40 and passes through a hole 38 in screen 36 down into bowl 15. From bowl 15 the fuel passes up through screen 36 into space 39 in the cover outside of diaphragms 30 and 31. From space 39, the fuel leaves the filter through outlet connection 41. A passage 42 in the cover, connects the parts of space 39 above and below the diaphragms.

When no hole or holes, such as holes 13 and 50 is provided for chamber 25 or 34, the air entrapped in said chambers can be considered as part of the spring means. Terms in the claims relating to position, such as over, above, up, down and the like, where consistent with the context, are to be considered as relative only.

I claim:

1. A filter and pulsation dampener for pulsating liquid feed means comprising a casing forming a chamber, filter means extending across an intermediate portion of the chamber dividing the chamber into an upper portion and a lower portion, a collapsible element, having at least one surface located for contact with liquid in the upper portion, resiliently resisting collapse as it yields, for increasing the volumetric capacity of said portion in accordance with the increase in pressure in the chamber and recovering from collapse in accordance with a decrease in pressure in said chamber, an inlet passage into the upper portion for leading the liquid from the feed means into the lower portion before passing through the filter means for its filtering action, an outlet passage in said upper portion for discharging the liquid from said upper portion after the liquid has passed up from the lower portion through the filter means for its filtering action, and baffle means in the upper portion at the inner end of the outlet passage, said baffle means by its presence causing a momentary downward or reverse flow of liquid through the filter means when said collapsible element recovers from collapse.

2. A filter and pulsation dampener for pulsating liquid feed means comprising a cover, a bowl, a screen, means for fastening the cover to the bowl, said cover being formed to provide a space therein, the screen being mounted with its edges all around gripped between the cover and the bowl, and provided with at least one clear opening separating said space in the cover from the space in the bowl, a collapsible element, having at least one surface located to face the liquid in the cover, resiliently resisting collapse as it yields for increasing the volumetric capacity of the cover in accordance with the increase in pressure in the cover and recovering from collapse in accordance with a decrease in pressure in the cover, an inlet passage in the cover extending clear through the space in the cover into contact with the screen at at least one clear opening in the screen, leading liquid from the feed means into the bowl before being subjected to filtering action by the screen, and an outlet passage in the cover for discharging the liquid from the space in the cover after the liquid has passed up from the bowl through the screen for its filtering action, the entrance to the outlet passage being at a distance above the screen but limited to the lower portion of the space in the cover, whereby air is trapped in the cover above the top of said entrance, the compression and expansion of said air with the increase and decrease in pressure in the cover cooperating with the yielding and recovery of the collapsible element to damp out the pulsations of the liquid leaving the outlet passages.

JOHN LEWIS ANDREWS.

REFERENCES CITED

The following references are of record in the file of this patent:

UNITED STATES PATENTS

| Number | Name | Date |
|---|---|---|
| 381,731 | Walker | Apr. 24, 1888 |
| 1,682,757 | Hopkins | Sept. 4, 1928 |
| 2,094,457 | Lattner | Sept. 28, 1937 |
| 2,132,952 | Hewitt | Oct. 11, 1938 |
| 2,332,982 | Blair | Oct. 26, 1943 |

FOREIGN PATENTS

| Number | Country | Date |
|---|---|---|
| 264,544 | Great Britain | of 1927 |